Aug. 25, 1936.  H. A. KNOX ET AL  2,051,864
SUSPENSION FOR VEHICLES
Filed April 17, 1934   2 Sheets-Sheet 1

Inventors
Harry A. Knox
Thomas H. Nixon
By W. H. Roach
Attorney

Aug. 25, 1936.    H. A. KNOX ET AL    2,051,864
SUSPENSION FOR VEHICLES
Filed April 17, 1934    2 Sheets-Sheet 2
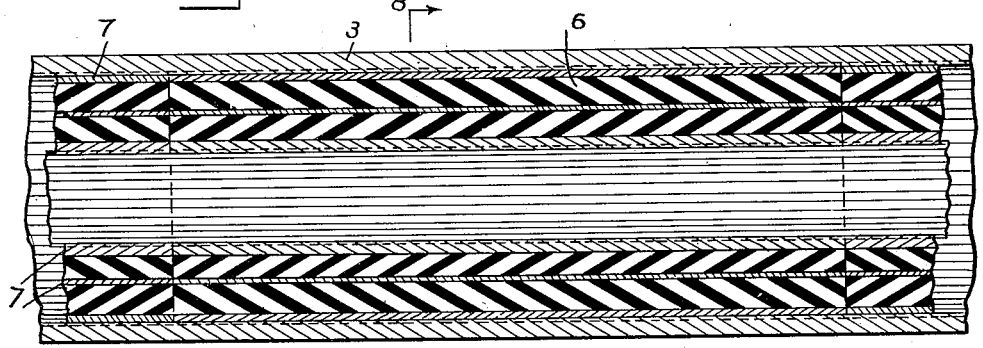
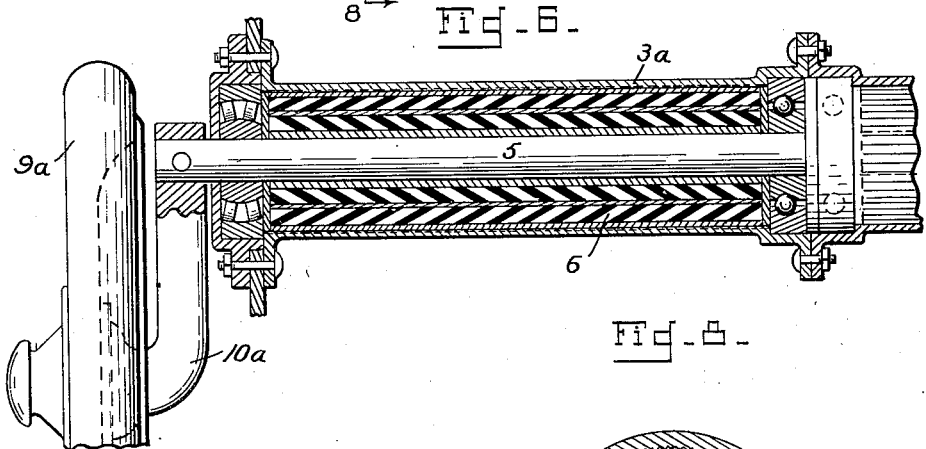
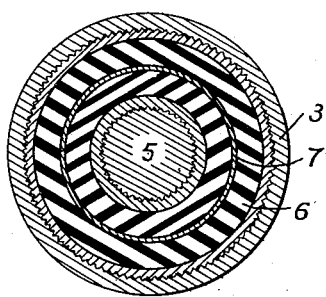
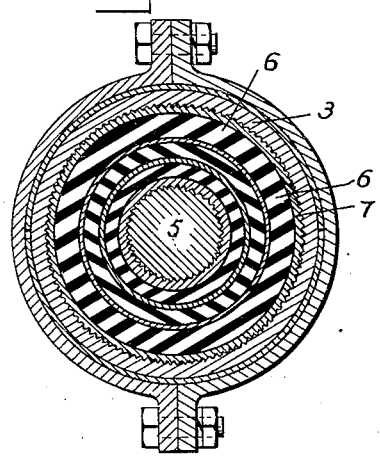
Inventors
Harry A. Knox
Thomas H. Nixon
By W. N. Roach
Attorney Patented Aug. 25, 1936

2,051,864

UNITED STATES PATENT OFFICE 2,051,864

SUSPENSION FOR VEHICLES

Harry A. Knox, Davenport, Iowa, and Thomas H. Nixon, United States Army, Gettysburg, Pa.

Application April 17, 1934, Serial No. 721,022

19 Claims. (Cl. 267—21)

(Granted under the act of March 3, 1883, as amended April 30, 1928; 370 O. G. 757)

The invention described herein may be manufactured and used by or for the Government for Governmental purposes, without the payment to us of any royalty thereon.

The subject of this invention is a suspension for vehicles, and relates more especially to a resilient bushing for oscillatable members.

The main object of the invention is the provision of a resilient element, specifically a bushing in which the material near to the center of angular motion will be more resistant to flexure than the material remote therefrom thus equalizing the work done by the material of the resilient element and not placing the heavier burden on the portion of the material most remote from the center of angular movement.

With the foregoing and such other objects in view as may hereinafter more fully appear, the invention resides in the novel arrangement and combination of parts and in the details of construction hereinafter described and claimed it being understood however, that changes in the precise embodiment of the invention herein disclosed may be made within the scope of what is claimed without departing from the spirit of the invention.

Practical embodiments of the invention are disclosed by way of illustration in the accompanying drawings, wherein:

Fig. 5 is a longitudinal section of another form of the bushing, and

Fig. 6 is a fragmentary view partly in section of another form of suspension with a bushing constructed in accordance with the invention.

Fig. 7 is a sectional view on the line 7—7 of Fig. 2, and

Fig. 8 is a section on the line 8—8 of Fig. 5.

Figure 1:
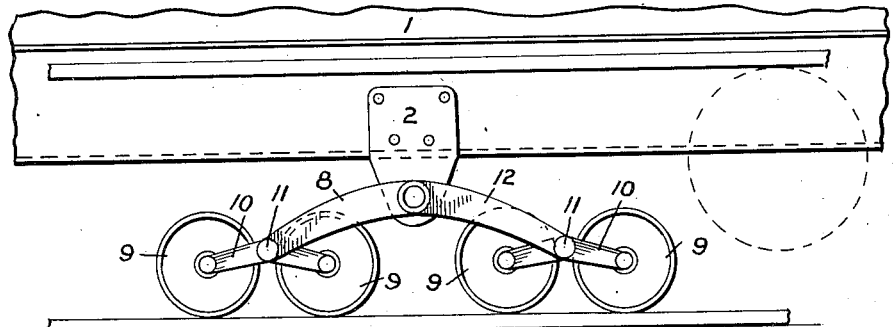
Fig. 1 is a view in side elevation of a vehicle provided with a suspension constructed in accordance with the invention.
Figure 2:
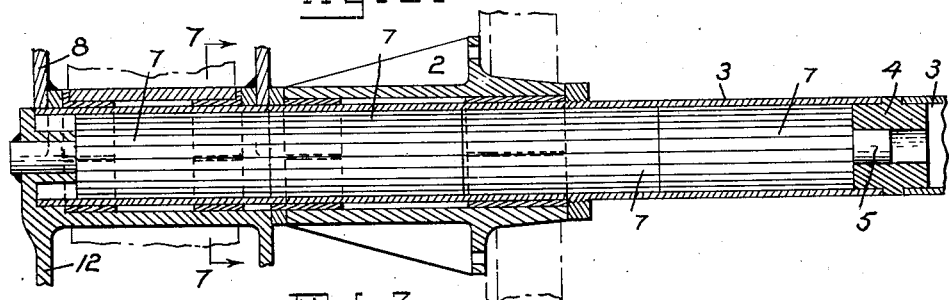
Fig. 2 is a fragmentary view in longitudinal section of the main supporting shaft of the suspension.

Referring to the drawings by numerals of reference:

There is provided a vehicle 1 to the sides of which brackets 2 (only one of which is shown) are secured. A hollow shaft 3 is journaled adjacent to its outer end in a bracket 2 and at its inner end, which is located in proximity to the vertical central longitudinal plane of the vehicle, is journaled on a cylindrical bearing 4 secured to the vehicle body.

Within each hollow shaft and spaced therefrom is a shaft 5 the inner end of which is journaled in the central bore of the bearing 4. Between each hollow shaft 3 and its inner shaft 5 is interposed a rubber bushing preferably made in sections as shown, and built up of a plurality of layers 6 of rubber separated by metal sleeves 7. The inner and outer sleeves 7 may be corrugated to engage corrugations on the inner shaft and hollow shaft respectively to prevent turning of the bushing with respect to the shafts.

The rubber layers are formed of rubber of different degrees of flexibility, the inner layer being the least flexible and the outer layer being the most flexible. This difference in flexibility may be secured by the character of the rubber used in the different layers or by the amount of rubber in the different layers since a thin layer of rubber will not flex to as great an extent as a thick layer.

Figure 3:
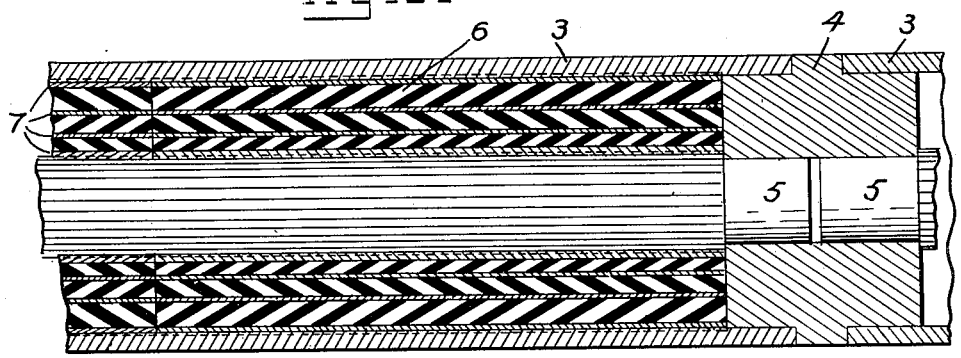
Fig. 3 is an enlarged sectional view of the portion shown at the right hand end of Fig. 2.
Figure 4:
Fig. 4 is a view in elevation partly in section of the outer casing of the resilient bushing.

On the outer end of each hollow shaft 3 is secured against movement with respect thereto an arm 8 on the free end of which is mounted a traction element herein shown as wheels 9—9 mounted on opposite ends of a truck 10 which is mounted for rocking movement, as at 11 on the arm 8. A similar arm 12 is secured to the outer end of each inner shaft 5 and has mounted thereon a truck 10 provided with wheels 9—9. These trucks may be mounted with rubber bushings such as shown in Figs. 3, 4, 5, 6, 7 and 8.

The modified form shown in Figs. 5 and 8 is similar to that described as the preferred form with the exception that a fewer number of layers of rubber are used. The layers in this instance are as heretofore described arranged with the rubber more resistant to flexure forming the inner layer and that less resistant to flexure forming the outer layer.

In the suspension illustrated in Fig. 6 the housing or casing 3ª is stationary being secured to the vehicle and immovable with respect thereto. The shaft 5 in this instance carries an arm 10ª provided with a ground engaging element as, for instance, the wheel 9ª. The bushing in this instance is the same as those heretofore described.

It is to be understood that the layers of rubber have such intimate contact with the inner sleeves 7 as to be immovable with respect thereto which may be secured by vulcanizing the rubber to the sleeve. It is also to be understood that the layers of elastic material forming the bushing are assembled under pressure, thus compressing each layer.

Whenever the terms more resistant and less resistant are used herein they will be understood as referring to rubber of less or greater flexibility respectively or to layers of rubber of different thicknesses, the thinner layer stretching less than the thicker layer.

We claim:

1. A vehicle suspension embodying telescoped shafts, ground engaging elements carried by the shafts, and bushings of elastic material engaging the shafts to limit angular displacement thereof, said bushings formed of concentric sleeves and concentric tubes of elastic material, each tube of a different degree of elasticity and each secured to one sleeve and assembled under compression with the next succeeding sleeve.

2. A vehicle suspension embodying a hollow shaft, a shaft within the hollow shaft, a bushing of elastic material of varying degrees of elasticity interposed between the shafts, said bushing formed of concentric sleeves and concentric tubes of elastic material each tube secured to one sleeve and assembled under compression with the next succeeding sleeve, and means carried by each shaft for mounting a ground engaging element thereon.

3. A vehicle suspension embodying a hollow shaft, a shaft within the hollow shaft, a bushing of elastic material of varying degrees of elasticity keyed to the inner shaft and engaging the outer shaft, said bushing formed of concentric sleeves and concentric tubes of elastic material each tube secured to one sleeve and assembled under compression with the next succeeding sleeve, and means carried by each shaft for mounting a ground engaging element.

4. A vehicle suspension embodying a hollow shaft, a shaft passing through the hollow shaft, a bushing of elastic material of varying degrees of elasticity engaging each shaft to limit the angular movement thereof, said bushing formed of concentric sleeves and concentric tubes of elastic material each tube secured to one sleeve and assembled under compression with the next succeeding sleeve, and means carried by each shaft for mounting a ground engaging element.

5. A vehicle suspension embodying a hollow shaft, a shaft within the hollow shaft, a bushing of elastic material of varying degrees of elasticity between the shafts, said bushings formed of concentric sleeves and concentric tubes of elastic material each tube secured to one sleeve and assembled under compression with the next succeeding sleeve, and a crank arm carried by each shaft for mounting a ground engaging element.

6. A vehicle suspension embodying a hollow shaft, a shaft within the hollow shaft, a metallic sleeve keyed to said inner shaft, a bushing of elastic material of varying degrees of elasticity vulcanized to the sleeve and press-fitted within the hollow shaft, said bushing formed of concentric sleeves and concentric tubes of elastic material each tube secured to one sleeve and assembled under compression with the next succeeding sleeve, and means carried by each shaft for mounting a ground engaging element.

7. A vehicle suspension embodying concentric shafts, crank arms carried by the shafts, said crank arms angularly disposed with respect to each other, means carried by each crank arm for mounting a ground engaging element, and bushings of elastic material of varying degrees of elasticity engaging the shafts to limit the angular displacement thereof, said bushings formed of concentric sleeves and concentric tubes of elastic material each tube secured to one sleeve and assembled under compression with the next succeeding sleeve.

8. A vehicle suspension embodying telescoped shafts, a crank arm carried by each shaft, said arms angularly disposed with respect to each other, means carried by each crank arm for mounting a ground engaging element, and bushings of elastic material of varying degrees of elasticity engaging the shafts to limit the angular displacement thereof, said bushings formed of concentric sleeves and concentric tubes of elastic material each tube secured to one sleeve and assembled under compression with the next succeeding sleeve.

9. A vehicle suspension embodying a hollow shaft, a shaft within the hollow shaft, a crank arm carried by each shaft, said arms being angularly disposed with respect to each other, means on each arm for mounting a ground engaging element, and a bushing of elastic material of varying degrees of elasticity interposed between the shafts, said bushings formed of concentric sleeves and concentric tubes of elastic material each tube secured to one sleeve and assembled under compression with the next succeeding sleeve.

10. A vehicle suspension embodying a shaft, a crank arm on the shaft, means on the arm for mounting a ground engaging element, a bushing of elastic material of varying degrees of eleasticity on the shaft to limit angular displacement thereof, said bushing formed of concentric sleeves and concentric tubes of elastic material each tube secured to one sleeve and assembled under compression with the next succeeding sleeve, and a bearing for the shaft at each end of the bushing.

11. A vehicle suspension embodying a shaft, a crank arm on the shaft, means on the arm for mounting a ground engaging element, a bushing of elastic material of varying degress of elasticity for the shaft to limit angular displacement thereof, said bushing formed of concentric sleeves and concentric tubes of elastic material each tube secured to one sleeve and assembled under compression with the next succeeding sleeve, and a bearing for the shaft.

12. A vehicle suspension embodying a shaft, a crank arm on the shaft, means on the arm for mounting a ground engaging element, and a bushing of elastic material of varying degrees of elasticity for the shaft to limit angular displacement thereof, said bushing formed of concentric sleeves and concentric tubes of elastic material each tube secured to one sleeve and assembled under compression with the next succeeding sleeve.

13. A vehicle suspension embodying a shaft, a crank arm on the shaft, means on the arm for mounting a ground engaging element; a built up elastic bushing for the shaft to limit angular displacement thereof, said bushing formed of concentric sleeves and concentric tubes of elastic material each tube secured to one sleeve and assembled under compression with the next succeeding sleeve, the inner layers of said bushing more resistant to flexure than the the outer layers, and a bearing for the shaft.

14. An elastic bushing for oscillatable members the inner portions of which have greater resistance to flexure than the outer portion, embodying sleeves and tubes of elastic material assembled under compression between the sleeves.

15. A built up elastic bushing for oscillatable members the inner layers of which have greater resistance to flexure than the outer layers, embodying sleeves and tubes of elastic material each tube secured to one sleeve and assembled under compression with the next succeeding sleeve.

16. An elastic bushing for oscillatable members embodying layers of flexible material the layers nearer to the axis of oscillation of greater resistance to flexure than those more remote, each layer under compression, and sleeves separating the layers.

17. A bushing embodying sleeves, and tubes of elastic material of different degrees of elasticity each tube secured to a sleeve and assembled under compression with the next succeeding sleeve.

18. A bushing embodying sleeves, and tubes of elastic material of different degrees of elasticity, each tube vulcanized to a sleeve and assembled under compression with the next succeeding sleeve.

19. A bushing embodying sleeves, and tubes of elastic material of different degrees of elasticity, each tube assembled under compression between adjacent sleeves.

HARRY A. KNOX.
THOMAS H. NIXON.